US005635128A

United States Patent [19]

Gardiner et al.

[11] Patent Number: 5,635,128
[45] Date of Patent: Jun. 3, 1997

[54] POLYMERS HAVING DECREASED SURFACE ENERGY

[75] Inventors: Eric S. Gardiner, Westtown; John T. Geoghegan, Portchester, both of N.Y.

[73] Assignee: Arizona Chemical Company, Panama City, Fla.

[21] Appl. No.: 651,358

[22] Filed: May 22, 1996

Related U.S. Application Data

[62] Division of Ser. No. 519,990, Aug. 28, 1995, Pat. No. 5,567,531, which is a division of Ser. No. 126,382, Sep. 23, 1993, Pat. No. 5,473,002.

[51] Int. Cl.$^6$ ............................................. B29B 15/00
[52] U.S. Cl. ........................ 264/523; 264/537; 264/328.1
[58] Field of Search .............................. 264/523, 532, 264/537, 328.1

[56] References Cited

U.S. PATENT DOCUMENTS

| | | | |
|---|---|---|---|
| 4,092,465 | 5/1978 | Uraneck et al. | 526/1 |
| 4,368,241 | 1/1983 | Ching | 428/447 |
| 4,560,719 | 12/1985 | Nakamura et al. | 524/269 |
| 4,613,641 | 9/1986 | Haubennestel et al. | 524/267 |
| 4,640,962 | 2/1987 | Ostrozynski et al. | 525/474 |
| 4,724,248 | 2/1988 | Dexter et al. | 524/262 |
| 4,739,001 | 4/1988 | Okamoto et al. | 524/264 |
| 4,758,637 | 7/1988 | Merrifield et al. | 525/474 |
| 4,766,181 | 8/1988 | Ostrozynski et al. | 428/395 |
| 4,837,274 | 6/1989 | Kseskuno et al. | 525/100 |
| 4,873,116 | 10/1989 | Ancker | 428/36.9 |
| 5,004,765 | 4/1991 | Atkins et al. | 523/434 |
| 5,017,635 | 5/1991 | Senuma et al. | 524/269 |
| 5,114,646 | 5/1992 | Nohr | 264/103 |

FOREIGN PATENT DOCUMENTS

| | | |
|---|---|---|
| 214658 | 3/1987 | European Pat. Off. . |
| 334051 | 9/1989 | European Pat. Off. . |
| 335406 | 10/1989 | European Pat. Off. . |

*Primary Examiner*—Peter D. Mulcahy
*Attorney, Agent, or Firm*—Luedeka, Neely & Graham, P.C.

[57] ABSTRACT

A method for forming a polymer with a decreased surface energy. The method comprises the steps of mixing from about 99.5% to about 95.0% of a polymer selected from the group consisting of polyolefin and polyester with from about 0.5% to about 5.0% of a surface modifying agent having the structure $R^1$—A—Si($R^2R^3$)—O—[Si($R^4R^5$)—O]$_n$—Si—($R^6R^7$)—A—$R^8$, and forming the mix of polymer and additive to a desired form. $R^1$ and $R^8$ are selected from the group consisting of derivatives of aliphatic or aliphatic/aromatic alcohols or mono-acids with a molecular weight of between about 250 to about 600 daltons, and A is selected from the group consisting of —O—, —NH—C(O)—NH—($CH_2$)$_3$—, and —C(O)—NH—($CH_2$)$_3$—. The agent is substantially intimately mixed with the polymer. The present invention also discloses a polymeric material with an increased surface energy prepared according to the method, a release liner, a method for forming injection molded or blow molded polymeric articles where the articles have a non-fugitive release agent, and a film extrusion processing aid comprising an additive for compounding with a polymeric composition being extruded.

6 Claims, No Drawings

POLYMERS HAVING DECREASED SURFACE ENERGY

This is a division of application Ser. No. 08/519,990, filed on Aug. 28, 1995, now U.S. Pat. No. 5,567,531, issued Oct. 22, 1996, which is a division of application Ser. No. 08/126,382, filed Sep. 23, 1993, now U.S. Pat. No. 5,473,002, issued Dec. 5, 1995.

FIELD OF THE INVENTION

The present invention relates to polymers with altered surface energies. In particular, the present invention relates to those polymers having a decreased surface energy.

BACKGROUND OF THE INVENTION

Polymeric materials are usually considered to have relatively low surface energies. However, it is often desirable to reduce the surface energy of these materials even further for special purposes.

Thus, for example, injection molded or blow molded polymeric articles often stick to the molds and release agents are required for coating the articles or molds. Also, coatings are used for polymeric release liners to provide for the easy release of labels or decals. Further, lubricants are applied to reduce the friction between two polymeric surfaces.

Silicone fluids have been used as mold releases and/or internal lubricants for molded thermoplastic articles for approximately 20 years. One of the drawbacks of the current practice is that, after transfer of the fluid from the surface of the mold to the molded surface or vice versa, the silicone fluid is fugitive. This can cause undesirable transfer to other surfaces during manufacturing and handling, or present problems for subsequent operations such as painting or plating.

Reactive silicone fluids are coated onto extruded laminates to provide adhesive-release surfaces. The major drawbacks with this practice are cost of the coatings and the need for a secondary coating operation.

It is an object of the present invention to provide a composition of matter which has utility in reducing the surface energy of polymers.

It is another object of the present invention to provide a polymer which has a decreased surface energy.

It is also an object of the invention to provide a release liner prepared from a polymer for use as a protective cover for tapes, adhesive films, labels, decals, etc.

It is a further object of the present invention to provide a polymer having a non-fugitive mold release for use in forming injection molded or blow molded articles.

In addition, it is an object of the present invention to provide a film extrusion processing aid, lubricant or antiblocking agent.

It is also an object of the present invention to provide a material with a reduced coefficient of friction for molded or extruded articles.

Consideration of the specification, including the Examples to follow, will enable one skilled in the art to determine additional objects and advantages of the invention.

SUMMARY OF THE INVENTION

The present invention comprises a method for forming a polymer with a decreased surface energy. The method comprises the steps of intimately mixing from about 99.5% to about 95.0% of a polymer selected from the group consisting of polyolefins and polyesters with from about 0.5% to about 5.0% of a surface energy modifying agent having the structure $R^1$—A—$Si(R^2R^3)$—O—$[Si(R^4R^5)$—$O]_n$—$Si(R^6R^7)$—A—$R^8$, and forming the mix of polymer and agent to a desired shape or structure. In the agent, $R^1$ and $R^8$ are selected from the group consisting of alkyl, aryl, and alkaryl derivatives of an aliphatic or aliphatic/aromatic alcohol or mono-acid with a molecular weight of between about 250 to about 600 daltons. A is selected from the group consisting of —O—, —NH—C(O)—NH—$(CH_2)_3$— and —C(O)—NH—$(CH_2)_3$—. Further, $R^2$, $R^3$, $R^6$ and $R^7$ are selected from the group consisting of $CH_3$, $C_2H_5$, $C_3H_7$, and $C_4H_9$, and $R^4$ and $R^5$ are selected from the group consisting of $CH_3$, $C_2H_5$, $C_3H_7$, and $(CH_2)_i$—$C_jF_{2j+1}$, wherein i is from 0 to 3 and j is from 1 to 3. Also, n is from 7 to 70 in the additive.

The surface energy modifying agent is substantially intimately mixed with the polymer. The mixing is accomplished by any of the methods known in the art for mixing polymers with additives. For example, the agent and polymer are both dissolved in compatible (i.e., miscible) solvents, the solvent solutions are mixed and the solvents removed, producing a polymer with a decreased surface energy. Similar polymers are produced by adding the agent to an extruder with the solid polymer followed by extrusion of the molten mix. Alternatively, the polymer and agent are mixed in a thermostatted vessel where both components are liquid, followed by cooling of the mixture.

By the time that the mix of the agent and polymer are in the desired form, at least a portion of the agent has migrated to or near the surface of the polymer thereby changing the surface characteristics of the polymer. The surface energy modifying agent is substantially non-fugitive from the polymer and, consequently, the surface energy of the polymer is substantially permanently lowered.

The polymer is preferentially either a polyolefin selected from the group consisting of polyethylene (PE), polypropylene (PP), polybutylene (PB), and polystyrene (PS) or a polyester, preferably poly(ethylene terephthalate) (PET).

When the polymer is PE, $R^1$ and $R^8$ are preferentially selected from the group consisting of derivatives of dehydroabietic acid, abietic acid, dihydroabietic acid, tetrahydroabietic acid, pimaric acid, and palustric acid, A is preferentially —C(O)—NH—$(CH_2)_3$—, $R^2$–$R^7$ are preferentially $CH_3$, and n is preferentially from 20 to 60. When the polymer is PP, a preferred form of the surface modifying agent is with $R^1$ and $R^8$ as abietyl, A is O, $R^2$–$R^7$ are $CH_3$, and n is from 7 to 15. In another preferred form of the agent when the polymer is PP, $R^1$ and $R^8$ are selected from the group consisting of derivatives of dehydroabietic acid, and dihydroabietic acid, A is —NH—C(O)—NH—$(CH_2)_3$—, $R^2$–$R^7$ are $CH_3$, and n is from 20 to 60.

When the polymer is PS, it is preferred that $R^1$ and $R^8$ are derivatives of abietyl, A is —O—, $R^2$–$R^7$ are $CH_3$, and n is from 7 to 15. When the polymer is PET, the preference is that $R^1$ and $R^8$ are derivatives of abietyl, A is —O—, $R^2$–$R^7$ are $CH_3$, and n is from 7 to 15.

The present invention also provides a polymeric material with a decreased surface energy comprising an intimate mixture of from about 99.5% to about 95.0% of a polymer selected from the group consisting of polyolefins and polyesters and from about 0.5% to about 5.0% of a surface modifying agent having the structure $R^1$—A—$Si(R^2R^3)$—O—$[Si(R^4R^5)$—$O]_n$—$Si(R^6R^7)$—A—$R^8$. In the agent, $R^1$ and $R^8$ are selected from the group consisting of alkyl, aryl, and alkaryl derivatives of an aliphatic or aliphatic/aromatic alcohol or mono-acid with a molecular weight of between about 250 to about 600 daltons. A is selected from the group consisting of —O—, —NH—C(O)—NH—(CH$_2$)$_3$—, and —C(O)—NH—(CH$_2$)$_3$—. R$^2$, R$^3$, R$^6$ and R$^7$ are selected from the group consisting of CH$_3$, C$_2$H$_5$, C$_3$H$_7$, and C$_4$H$_9$, and R$^4$ and R$^5$ are selected from the group consisting of CH$_3$, C$_2$H$_5$, C$_3$H$_7$, and (CH$_2$)$_i$—C$_j$F$_{2j+1}$, wherein i is from 0 to 3 and j is from 1 to 3. Further, n is from 7 to 70.

In a preferred embodiment of the polymeric material of the invention, the polymer is a polyolefin selected from the group consisting of polyethylene (PE), polypropylene (PP), polybutylene (PB), and polystyrene (PS). In another preferred embodiment of the invention, the polymer is a polyester, preferably poly(ethylene terephthalate) (PET).

When the polymer is PE, a preferred agent is formulated such that R$^1$ and R$^8$ are selected from the group consisting of derivatives of dehydroabietic acid, abietic acid, dihydroabietic acid, tetrahydroabietic acid, pimaric acid, and palustric acid, A is —C(O)—NH—(CH$_2$)$_3$—, R$^2$-R$^7$ are CH$_3$, and n is from 20 to 60. Where the polymer is PP, it is preferred that either R$^1$ and R$^8$ are abietyl, A is —O—, R$^2$-R$^7$ are CH$_3$, and n is from 7 to 15, or R$^1$ and R$^8$ are selected from the group consisting of derivatives of dehydroabietic acid, and dihydroabietic acid, A is —NH—C(O)—NH—(CH$_2$)$_3$—, R$^2$-R$^7$ are CH$_3$, and n is from 20 to 60.

When the polymer is PS, a preferred embodiment of the surface modifying agent is that R$^1$ and R$^8$ are derivatives of abietyl, A is —O—, R$^2$-R$^7$ are CH$_3$, and n is from 7 to 15. Where the polymer is PET, it is preferred that R$^1$ and R$^8$ are derivatives of abietic acid, A is —O—, R$^2$-R$^7$ are CH$_3$, and n is from 7 to 15.

The present invention also provides a release liner comprising a low surface energy polymeric film prepared from an intimate mix of a polymer and a polymer surface energy modifying agent as described above. The film is either a stand-alone film or an extrusion laminant, usually on paper or board. Preferred embodiments of the composition of the release liner are similar to the preferred embodiments described above.

In addition, the present invention also provides a method for forming injection molded or blow molded polymeric articles where the articles have a non-fugitive release agent. The method comprises the steps of mixing from about 99.5% to about 95.0% of a polymer as described above with from about 0.5% to about 5.0% of an mold release agent having the structure R$^1$—A—Si(R$^2$R$^3$)—O—[Si(R$^4$R$^5$)—O]$_n$—Si(R$^6$R$^7$)—A—R$^8$, molding the mix of polymer and mold release agent by injection or blow molding in a mold form, and releasing the molded article from the mold form. In the release agent R$^1$-R$^8$, A, and n are as set forth above. The mixing of the polymer with the mold release agent is accomplished so as to produce an intimate mixture of the polymer and the agent. Examples include, but are not limited to, mixing solvent solutions of the components, melt mixing followed by extrusion, and mixing in melts.

Further, the present invention provides for a film extrusion processing aid comprising an additive for compounding with a polymeric composition being extruded. The additive has the structure R$^1$—A—Si(R$^2$R$^3$)—O—[Si(R$^4$R$^5$)—O]$_n$—Si(R$^6$R$^7$)—A—R$^8$ wherein R$^1$ and R$^8$ are selected from the group consisting of alkyl, aryl, and alkaryl derivatives of an aliphatic or aliphatic/aromatic alcohol or mono-acid with a molecular weight of between about 250 to about 600 daltons, A is selected from the group consisting of —O—, —NH—C(O)—NH—(CH$_2$)$_3$—, and —C(O)—NH—(CH$_2$)$_3$—, R$^2$, R$^3$, R$^6$ and R$^7$ are selected from the group consisting of CH$_3$, C$_2$H$_5$, C$_3$H$_7$, and C$_4$H$_9$, R$^4$ and R$^5$ are selected from the group consisting of CH$_3$, C$_2$H$_5$, C$_3$H$_7$, and (CH$_2$)$_i$—C$_j$F$_{2j+1}$, wherein i is from 0 to 3 and j is from 1 to 3, and n is from 7 to 70. When added to the polymeric material, the additive is intimately mixed with the polyolefin. Preferred embodiments of the additive are as set forth above.

In the practice of the present invention, the surface energy of a polyolefin or polyester is substantially reduced by the addition and intimate mixing of the surface energy modifying agent of the present invention to a polymeric material. It is believed that the surface of the polymeric material exhibits a decreased surface energy due to the presence of the siloxane midblock of the agent at the surface of the polymeric material. The agent is substantially non-fugitive from the polymeric material due to the presence of the groups attached as end blocks to the siloxane midblock of the surface modifying agent. The hydrocarbon end blocks of the agent provide anchors in the body of the polymeric material while the midblock exists at the surface of the polymeric material.

The decrease in surface energy of the polymeric material allows a variety of uses for the material. For example, such materials with decreased surface energy are formed into films for use as release liners. Such release liners are used as protective covers for tapes, adhesive films, labels, or decals. In addition, such polymeric materials are used as hot melt or hot melt pressure sensitive adhesive containers. A release liner according to the present invention is formed by the compounding of the agent with the desired polymeric material and then fashioning the compounded material into the desired form, such as a film or sheet for use as a decal backing.

When formed into a container, as by folding of the above-described sheet materials or by injection molding, such a release liner also serves as a container for materials having high tack values such as various adhesives. The low surface energy of the container substantially prevents an adhesive from sticking to the container and allows easier access to and a more complete removal of the adhesive from the container.

With the decrease in surface energy, there is often also a reduction in the coefficient of friction for polymeric articles prepared according the present invention. Articles of this nature find use as, for example, bearings and other such non-stick applications.

The surface modifying agent itself is useful as a film extrusion processing aid, lubricant or anti-blocking agent. In use, the agent is introduced into and is intimately mixed with the polymer to be extruded as a film. The agent is combined with the polymer at from about 0.1% to about 1.0% based on the weight of the polymer to be extruded. The presence of the agent aids in the processing of the extrusion of the film and prevents blocking of the polymer film during winding and unwinding.

In order to facilitate a further understanding of the invention, the following examples primarily illustrate certain more specific details thereof.

EXAMPLE I

Synthesis of Abietyl Additive:

An α,ω-dichloro polydimethyl siloxane (PDMS) oligomer with a molecular weight of between 400 and 600 Da was esterified with two equivalents of abietyl alcohol in pyridine solution at 116°±1° C. for 54 hours. The solution was filtered to remove by-product pyridinium hydrochloride. The solution was then diluted with toluene and washed four times with water. The solvent was removed by distillation. The resulting additive (Additive A) had the structure: abietyl-$CH_2$—O—$Si(CH_3)_2$—O—$[Si(CH_3)_2$—O—$]_{n-Si}$ $(CH_3)_2$—O—$CH_2$-abietyl; n=7.

EXAMPLE II

Synthesis of Diamino PDMS Telomer:

A series of α,ω-diamino PDMS telomers with number average molecular weights of between 2,000 and 20,000 Da were synthesized by anionic copolymerization of bis—(3-aminopropyl)tetramethyldisiloxane with octamethylcyclotetrasiloxane. The reaction was run neat and initiated with either potassium siloxane or tetramethylammonium siloxanoate as a catalyst. The resulting telomer (Compound B) was used for additional additives.

EXAMPLE III

Synthesis of Rosin Additive:

Rosin amine (64% dehydroabietyl) was converted to rosin isocyanate by reaction of the amine with triphosgene. Two equivalents of the rosin isocyanate were reacted with Compound B of Example II. The reaction was run with toluene as a solvent. The reaction was run at 30° C. for one hour followed by reaction at 70° C. for one hour. The solvent was removed by distillation. The resulting additive (Additive C) had the structure: dehydroabietyl-NH—$(CH_2)_3$—$Si(CH_3)_2$—O—$[Si(CH_3)_2$—O—$]_n$—$Si(CH_3)_2$—$(CH_2)_3$—NH—C(O)—NH-dehydroabietyl; n=28 and 57.

EXAMPLE IV

Alternative Synthesis of Rosin Additive:

Three equivalents of the rosin acid were reacted with Compound B of Example II. The reaction was run with xylene as a solvent. The reaction was run at 142° C. for 6 hours with azeotropic removal of evolved water. The solvent was removed by distillation and the excess rosin was removed by vacuum distillation. The resulting additive (Additive D) had the structure: rosin-C(O)—NH—$(CH_2)_3$—$Si(CH_3)_2$—O—$[Si(CH_3)_2$—O—$]_n$—$Si(CH_3)_2$—$(CH_2)_3$—NH—C(O)-rosin; n=28 and 57.

EXAMPLE V

Alternative Synthesis of Rosin Additive:

Two equivalents of the rosin acid were reacted with Compound B of Example II in refluxing methylene chloride in the presence of a strong condensation aid (such as dicyclohexyl carbodiimide). The reaction solution was filtered to remove the by product urea and the solvent was removed by distillation. The resulting additive (Additive E) had the structure: rosin-C(O)—NH—$(CH_2)_3$—$Si(CH_3)_2$—O—$Si(CH_3)_2$—$(CH_2)_3$—NH—C(O)-rosin; n=28 and 57.

EXAMPLE VI

Performance of the Additives in Polymers:

The Additives of Examples I and III-V were mixed into molten extrusion grade polymers (polyethylene [PE], polypropylene [PP], polystyrene [PS], and poly[ethylene terephthalate] [PET]) (2 wt. % of the additive to 98 wt. % of the polymer) and then cast onto glass microscope slides. Surface activity was measured by water droplet contact angle (sessile drop at 23°±1° C., distilled water with <0.01% aniline blue as contrast agent) at the air/polymer interface. The difference in the contact angle of the water droplet on a polymer containing the additive was measured against the contact angle of a water droplet on a polymer film (prepared at the same time) without the additive. Increased water contact angle indicated lowered surface energy. The results are shown in Table I.

TABLE I

| Additive | Host Polymer | Contact Angle (°) | Difference (°) |
| --- | --- | --- | --- |
| A (n = 7) | PP | 107 | +8 |
| A (n = 7) | PS | 94 | +12 |
| A (n = 7) | PET | 91 | +20 |
| C (n = 57) | PP | 107 | +11 |
| D (n = 57) | PE | 98 | +10 |
| C (n = 28) | PE | 99 | +16 |
| D (n = 28) | PE | 99 | +16 |

Additive A performs well in polypropylene (PP), but performs best in polystyrene (PS) and poly(ethylene terephthalate) (PET). Additive C (n=57) performs best in P while additive D (n=57) and additives C (n=28) and D (n=28) perform best in polyethylene (PE).

Although this specification discloses particular embodiments of the invention, these examples merely describe illustrations of the invention. Those skilled in the art may suggest numerous rearrangements, modifications and substitutions of parts of the invention without departing from the spirit of the invention.

The appended claims set forth various novel and useful features of the invention.

What is claimed is:

1. A method for forming injection molded or blow molded polymeric articles with a non-fugitive release agent, said method comprising:

mixing from about 99.5% to about 95.0% of a polyolefin with from about 0.5% to about 5.0% of a mold release agent having the structure $R^1$—A—$Si(R^2R^3)$—O—$[Si(R^4R^5)$—O$]_n$—$Si(R^6R^7)$—A—$R^8$ wherein $R^1$ and $R^8$ are selected from the group consisting of alkyl, aryl, and alkaryl derivatives of an aliphatic or aliphatic/aromatic alcohol or mono-acid with a molecular weight of between about 250 to about 600 daltons, A is selected from the group consisting of —O—, —NH—C(O)—NH—$(CH_2)_3$—, and C(O)—NH—$(CH_2)_3$—, $R^2$, $R^3$, $R^6$ and $R^7$ are selected from the group consisting of $CH_3$, $C_2H_5$, $C_3H_7$, and $CH_4H_9$, $R^4$ and $R^5$ are selected from the group consisting of $CH_3$, $C_2H_5$, $C_3H_7$, and $(CH_2)_i$—$C_jF_{2j+1}$, wherein i is from 0 to 3 and j is from 1 to 3, and n is from 7 to 70, wherein the mold release additive is substantially intimately mixed with the polymer;

molding the mix of polymer and mold release additive by injection or blow molding in a mold form; and releasing the molded article from the mold form.

2. The method of claim 1 wherein the polyolefin is selected from the group consisting of polyethylene (PE), polypropylene (PP), polybutylene (PB), and polystyrene (PS).

3. The method of claim 2 wherein the polyolefin is PE, $R^1$ and $R^8$ are selected from the group consisting of derivatives of dehydroabietic acid, abietic acid, dihydroabietic acid, tetrahydroabietic acid, pimaric acid, and palustric acid, A is —C(O)—NH—$(CH_2)_3$—, $R^2$, $R^3$, $R^4$, $R^5$, $R^6$, and $R^7$ are $CH_3$, and n is from 20 to 60.

4. The method of claim 2 wherein the polyolefin is PP, $R^1$ and $R^s$ are abietyl, A is —O—, $R^2$, $R^3$, $R^4$, $R^5$, $R^6$, and $R^7$ are $CH_3$, and n is from 7 to 15.

5. The method of claim 2 wherein the polyolefin is PP, $R^1$ and $R^8$ are selected from the group consisting of derivatives of dehydroabietic acid, and dihydroabietic acid, A is —NH—C(O)—NH—$(CH_2)_3$—, $R^2$, $R^3$, $R^4$, $R^5$, $R^6$, and $R^7$ are $CH_3$, and n is from 20 to 60.

6. The method of claim 2 wherein the polyolefin is PS, $R^1$ and $R^8$ are derivatives of abietic acid, A is O, $R^2$, $R^3$, $R^4$, $R^5$, $R^6$, and $R^7$ are $CH_3$, and n is from 7 to 15.

* * * * *

UNITED STATES PATENT AND TRADEMARK OFFICE
CERTIFICATE OF CORRECTION

PATENT NO. : 5,635,128
DATED : June 3, 1997
INVENTOR(S) : Eric S. Gardiner and John T. Geoghegan It is certified that error appears in the above-indentified patent and that said Letters Patent is hereby corrected as shown below:

Column 5, line 53, change "rosin-C(O)-NH-(CH$_2$)$_3$-Si(CH$_3$)$_2$-O-Si(CH$_3$)$_2$-(CH$_2$)$_3$-NH-C(O)-rosin; n = 28 and 57" to -- rosin-C(O)-NH-(CH$_2$)$_3$-Si(CH$_3$)$_2$-O-[Si(CH$_3$)$_2$-O-]$_n$-Si(CH$_3$)$_2$-(CH$_2$)$_3$-NH-C(O)-rosin; n = 28 and 57 --.

Column 6, line 51, change "polymer" to -- polyolefin --
Column 6, line 52, change "polymer" to -- polyolefin --

Signed and Sealed this

Seventh Day of October, 1997

Attest:

BRUCE LEHMAN

Attesting Officer     Commissioner of Patents and Trademarks